United States Patent [19]

Kaku

[11] Patent Number: 4,991,039
[45] Date of Patent: Feb. 5, 1991

[54] APPARATUS FOR DETECTING TAPE-END

[75] Inventor: Nobuyuki Kaku, Yokohama, Japan

[73] Assignee: Hitachi, Ltd., Tokyo, Japan

[21] Appl. No.: 426,240

[22] Filed: Oct. 25, 1989

[30] Foreign Application Priority Data

Oct. 28, 1988 [JP] Japan .................. 63-270641

[51] Int. Cl.$^5$ ................ G11B 15/61; G11B 15/02
[52] U.S. Cl. .................................. 360/85; 360/95; 360/74.1
[58] Field of Search ............. 360/74.1, 74.2, 69, 360/74.5, 74.6, 85, 95; 242/186, 188, 190

[56] References Cited

U.S. PATENT DOCUMENTS 4,528,604 7/1985 Koyana ........................ 360/74.6
4,616,274 10/1986 Nagoaka ........................ 360/74.6

Primary Examiner—David J. Severin
Attorney, Agent, or Firm—Antonelli, Terry, Stout & Kraus

[57] ABSTRACT

An apparatus for detecting a tape-end, according to the present invention, comprising, a tape cassette including a magnetic tape wound on reels received in the tape cassette, and tape-ends arranged between the reels and magnetic tape respectively so that the magnetic tape is connected to the reels through the tape-ends, a magnetic head drum on which the magnetic tape is loaded, a tape loading device which draws out the tape from the tape cassette and which loads the magnetic tape onto a head surface of the magnetic head drum, tape-end detectors for detecting the tape ends on tape paths between the magnetic head drum and the reels, and loading controlling means including a loading phase measuring instrument which measures a phase of the tape loading device during loading operation when at least one of the tape-end detectors detects the tape end, the loading controlling means generating control signals for controlling the loading operation of the tape loading device in accordance with the measured phase, so that the time required until the loading operation is completed is shortened in comparison with the prior art.

8 Claims, 14 Drawing Sheets

F I G. 17A
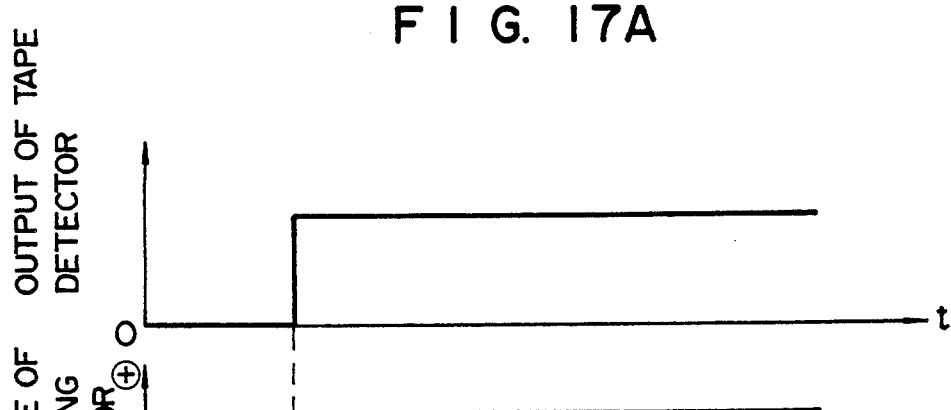
F I G. 17B
F I G. 17C
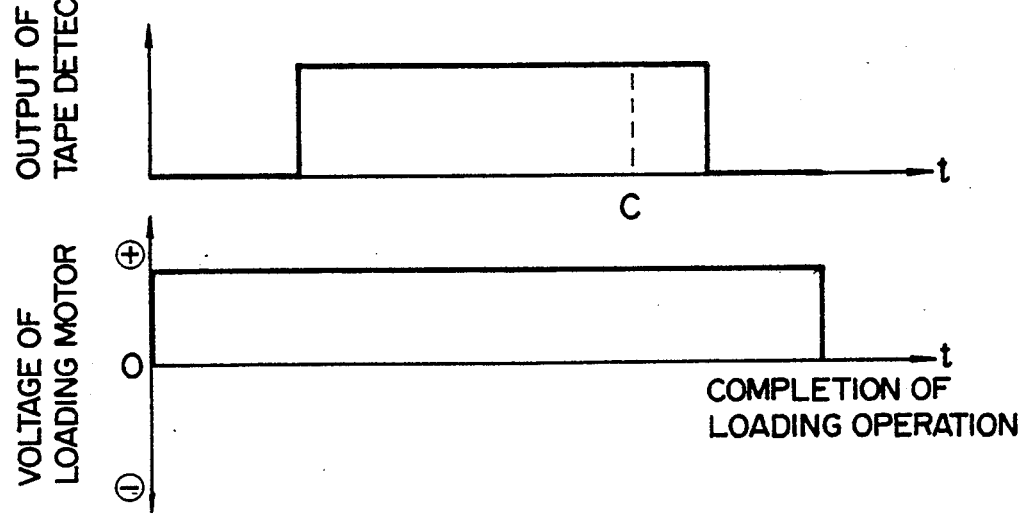

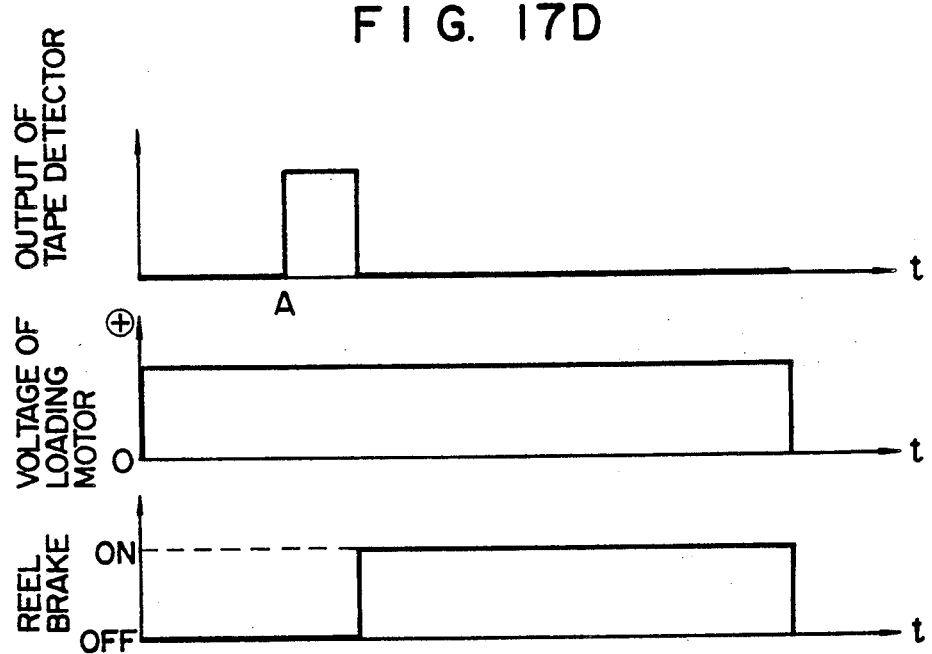
F I G. 17D
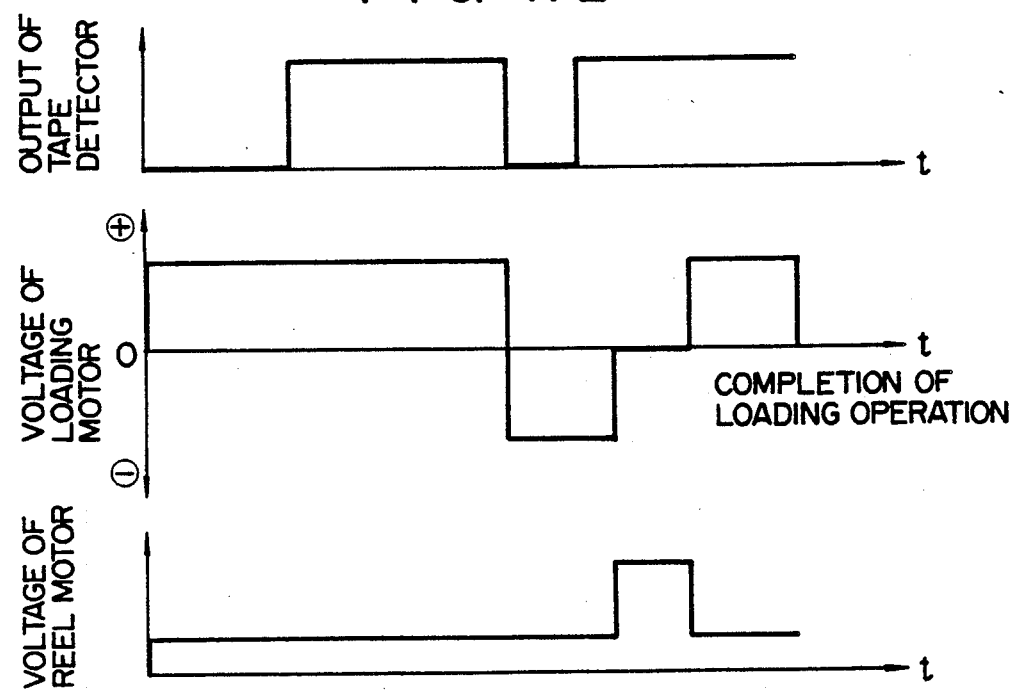
F I G. 17E

APPARATUS FOR DETECTING TAPE-END

BACKGROUND OF THE INVENTION AND RELATED ART STATEMENT

The present invention relates to an apparatus in which a rotational magnetic head records and reproduces signals on a magnetic tape, more particularly to an apparatus which detects a tape-end to prevent the magnetic head from being damaged.

In an apparatus of this kind has generally a tape-end detecting apparatus, when a tape-end which does not have a surface coated with a magnetic material and which is drawn out from a tape supplying side reel or from a tape pulling side reel is detected, tape feed is stopped and the tape-end is prevented from contacting with a magnetic head drum so that a magnetic head is not damaged by the tape-end. Since in a, conventional tape-cassette mounted in a recorder which of the magnetic tape and the tape-end will be drawn out from the tape cassette can be measured in the tape cassette, there is no problem of detecting the tape-end.

On the other hand, in some kinds of tape cassettes, which of the magnetic tape and the tape-end will be drawn out from the tape cassette can not be measured in the tape cassette when the tape is not drawn out from the tape cassette. Therefore, when these kinds of tape cassettes are used, it is necessary to employ a tape loading mechanism as disclosed in Japanese Patent Unexamined Publication No. 58-150151, which mechanism detects the tape-end at the outside of the tape cassette after the tape is drawn out from the tape cassette. Since a tape-end detecting mechanism can not detect the tape-end until the tape loading operation proceeds to draw out a predetermined amount of tape, the tape-end detecting mechanism is arranged in the vicinity of the tape cassette so that the tape-end can be detected before the tape loading mechanism makes the tape contact with the magnetic head drum. When the tape-end detecting mechanism detects the tape-end, the tape loading operation is stopped and the tape unloading operation is started. After a suitable amount of tape is wound on the reel in the tape cassette, the tape loading operation is resumed. By this manner, the tape-end is prevented from being loaded onto the magnetic head drum, so that the magnetic head drum is not damaged by the tape-end.

In the above-mentioned conventional manner, whenever the tape-end is detected, the tape unloading operation is started and after the suitable amount of tape is wound on the reel in the tape cassette, the tape loading operation is resumed. Even if just before the tape loading operation is completed the tape-end is detected, the unloading operation is started. Therefore, a long time is often needed for completion of the tape loading operation.

OBJECT AND SUMMARY OF THE INVENTION

The object of the present invention is to provide an apparatus for detecting a tape-end, by which apparatus the tape-end is prevented from contacting with a rotational magnetic head so that the magnetic head is not damaged by the tape-end and by which a time required after the tape cassette is mounted in a recorder and until tape loading operation is completed is shortened in comparison with the conventional manners.

An apparatus for detecting a tape-end, according to the present invention, comprising, a tape cassette including a magnetic tape wound on reels received in the tape cassette, and tape-ends arranged between the reels and magnetic tape respectively so that the magnetic tape is connected to the reels through the tape-ends, a magnetic head drum on which the magnetic tape is loaded, a tape loading device which draws out the tape from the tape cassette and which loads the magnetic tape onto a head surface of the magnetic head drum, tape-end detectors for detecting the tape ends on tape paths between the magnetic head drum and the reels, and loading controlling means including a loading phase measuring instrument which measures a phase of the tape loading device during loading operation when at least one of the tape-end detectors detects the tape end, the loading controlling means generating control signals for controlling the loading operation of the tape loading device in accordance with the measured phase.

In the apparatus for detecting a tape-end, according to the present invention, the tape-end detectors are arranged respectively on the tape paths between the magnetic head drum and the reels, and detect the tape-ends, that is, the leader tapes drawn out from the reels. The loading controlling means include the loading phase measuring instrument which is connected to the tape loading device for drawing out the tape from the tape cassette and which measures the phase, that is, the position of the tape loading device during loading operation. The loading phase measuring instrument measures a length of tape which is drawn out from the cassette until the tape-end is detected and simultaneously measures a length of tape which is drawn out from the cassette after the tape-end is detected and before the tape loading operation is completed.

The loading controlling means generate control signals for controlling the loading operation of the tape loading device after the detection of tape-end in accordance with the phase of tape loading device which is measured by the loading phase measuring instrument when the tape-end detector detects the tape-end.

As a result of the above-mentioned structure, the leader tape is prevented from being loaded onto the magnetic head drum so that the magnetic head drum is not damaged by the leader tape, and since the unloading operation is not needed, the time for loading operation is short.

BRIEF DESCRIPTION OF THE DRAWINGS

FIG. 17A is a diagram showing a relation among condition of tape loading, operation of loading motor and output of tape-end detector.

FIG. 17B is a diagram showing a relation among condition of tape loading, operation of loading motor and output of tape-end detector.

FIG. 17C is a diagram showing a relation among condition of tape loading, operation of loading motor and output of tape-end detector.

FIG. 17D is a diagram showing a relation among condition of tape loading, operation of reel blake and rotational condition of reel.

FIG. 17E is a diagram showing a relation among condition of tape loading, operation of loading motor and rotational condition of reel.

DETAILED DESCRIPTION OF PREFERRED EMBODIMENT

Figure 1:
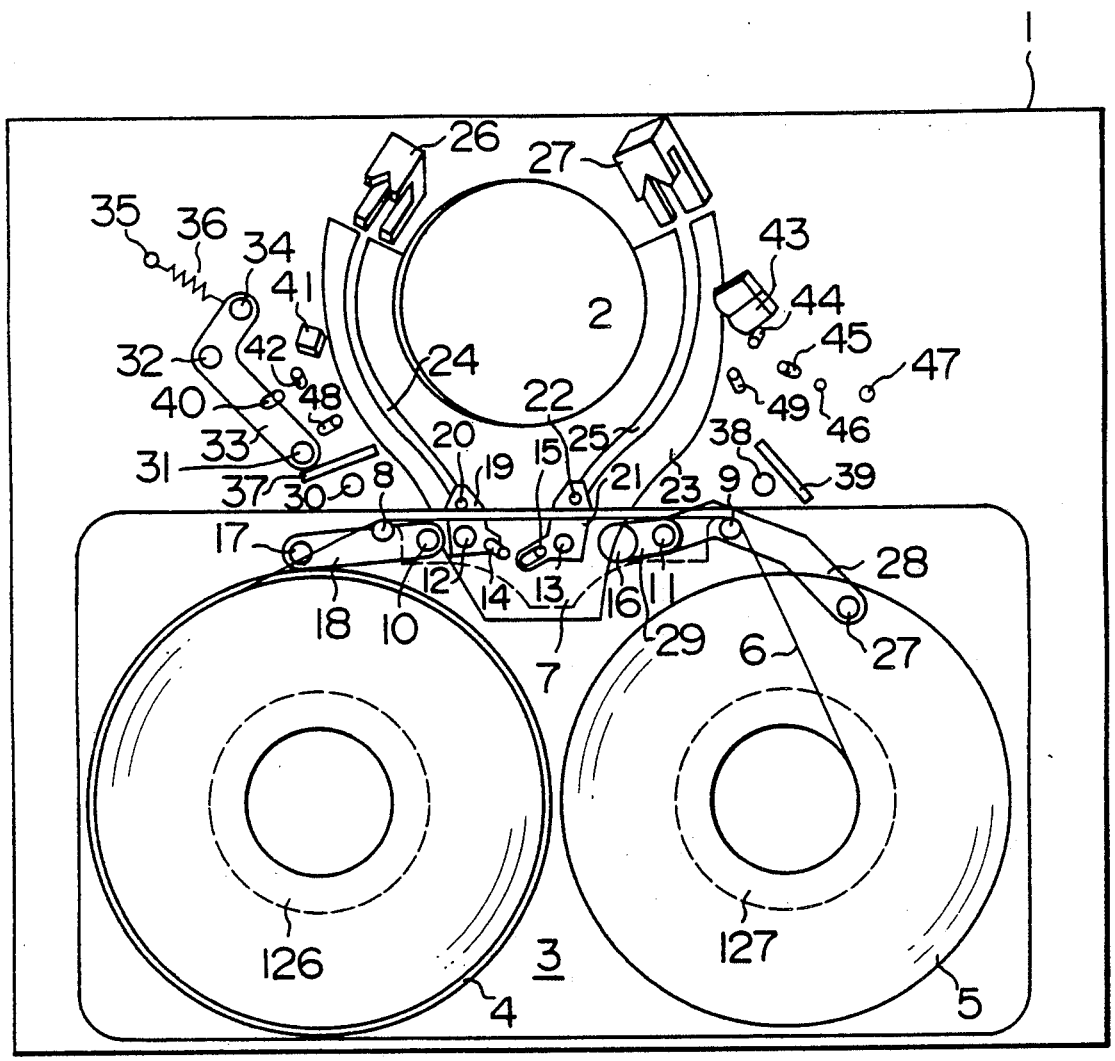
FIG. 1 is a plane view showing a tape loading apparatus before the tape setting operation is started.

In FIG. 1, an inclined magnetic head drum 2 is mounted on a chassis 1. The magnetic head drum 2 has a rotating magnetic head. A cassette 3 has a tape supplying reel 4 and a tape pulling reel 5 for receiving the predetermined amount of a tape 6. Both ends of the tape 6 are connected to the respective reels through leader tapes. The cassette 3 has a cassette opening 3 over which the tape 6 extends. When the cassette 3 is attached on the chassis 1 as shown in FIG. 1, tape guides 10 and 11, sliding tape guides 12 and 13, inclined guides 14 and 15, and a pinch roller 16 are inserted in the cassette opening 3. The tape guide 10 is mounted on an end of an arm 18 which is rotatable on a shaft 17 attached to the chassis 1. The guide roller 12 and the inclined guide 14 are mounted on a slide base 19 with the predetermined positional relation therebetween. The slide base 19 also has a positioning pin 20 at a forward end thereof. The guide roller 13 and the inclined guide 15 are mounted on a slide base 21 with the predetermined positional relation therebetween. The slide base 21 also has a positioning pin 22 at a forward end thereof. By driving mechanisms described below, the slide bases 19 and 21 are moved along guide grooves 24 and 25 of a guide plate 23 fixed on the chassis 1, respectively. The positioning members 26 and 27 are arranged in the vicinities of the forward ends of guide grooves 24 and 25, respectively. The tape guide 11 is mounted on an end of an arm 28 which is rotatable on a shaft 27 attached to the chassis 1. An end of an arm 29 is rotatable on the axis of the tape guide 11, and the pinch roller 16 is mounted on another end of the arm 29.

Figure 2:
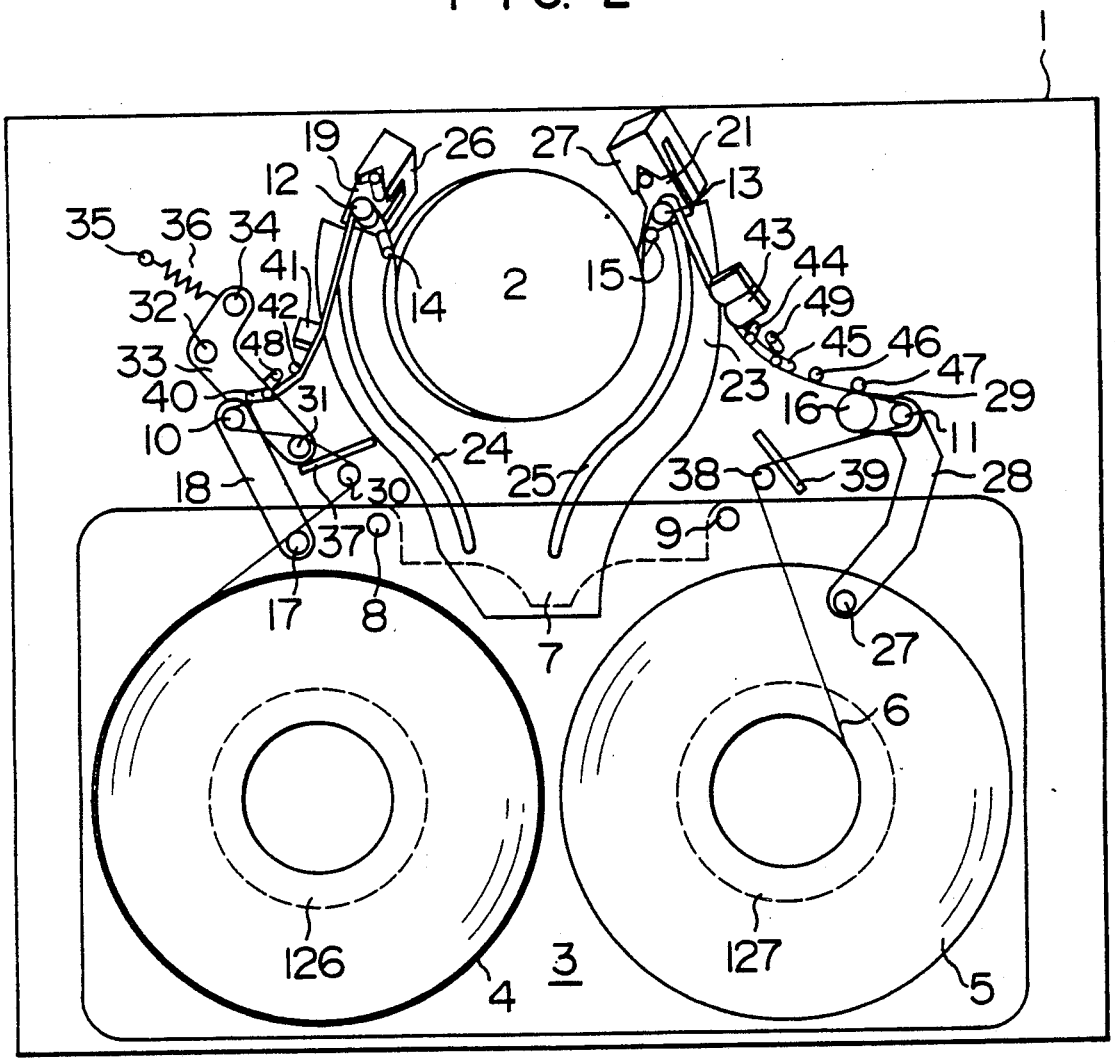
FIG. 2 is a plane view showing a tape loading apparatus after the tape is set on a cylindrical head drum surface.
Figure 3:
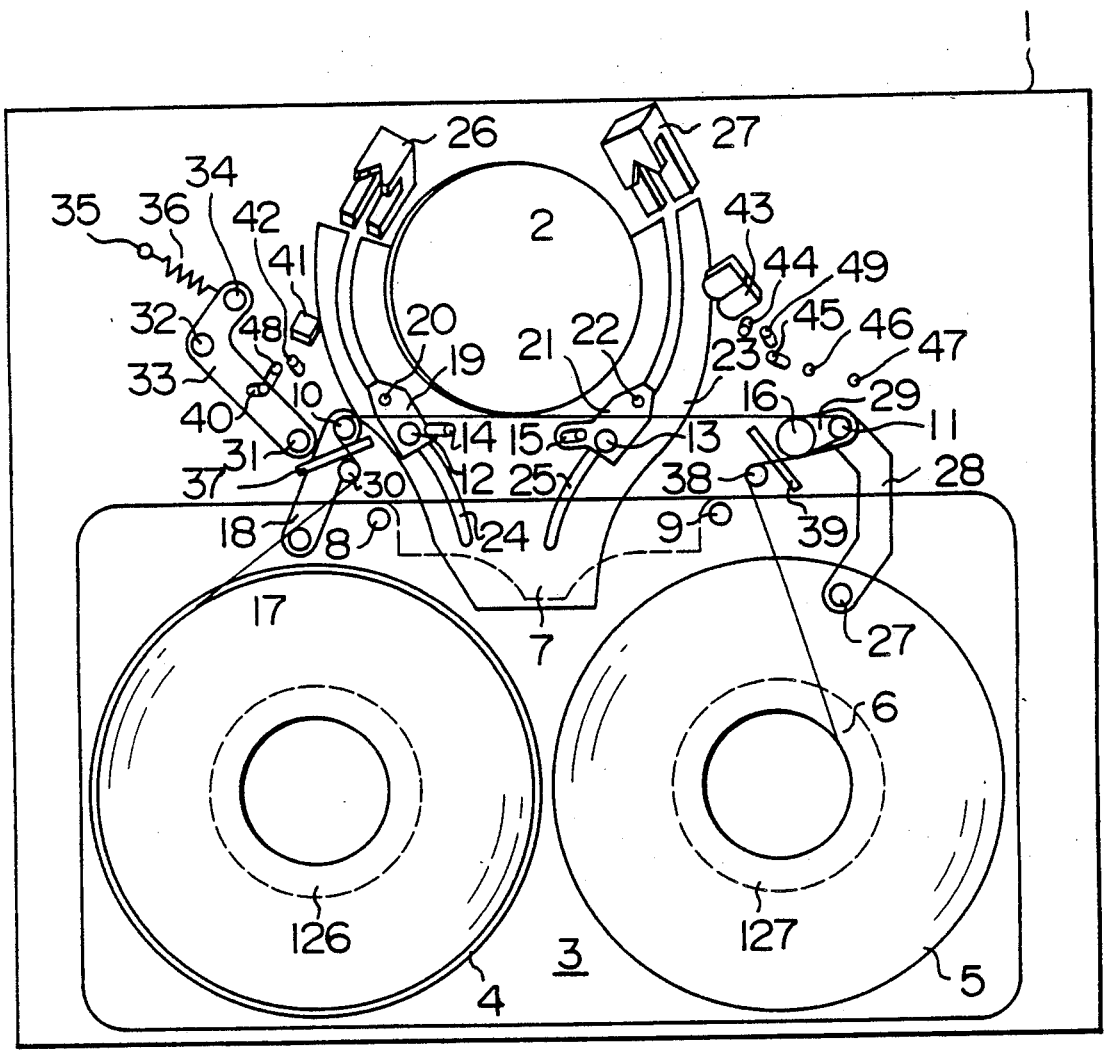
FIG. 3 is a plane view showing a tape loading apparatus during the tape setting operation.

In FIGS. 2 and 3, tape loading operation is forwarded as follows. The tape guide 10 on the arm 18 rotates around the shaft 17 to draw out the tape 6 of tape supplying side from the cassette 3 and the drawn out tape 6 contacts with a guide 30 and a tension pin 31 in the vicinity of the tape supplying reel 4. The tension pin 31 is mounted on an end of an arm 33 which is rotatable on a shaft 32. A shaft 34 fixed on another end of the arm 33 is pulled through a spring 36 toward a pin 35 fixed on the chassis 1, so that the arm 33 is pulled in the anti-clockwise direction. An end-tape (leader tape) detector 37 is arranged in a tape path between the guide 30 and the tension pin 31. The tape guide 11 on the arm 28 rotates around the shaft 27 to draw out the tape 6 of tape pulling side from the cassette 3. The pinch roller 16 is arranged in the vicinity of the tape guide 11 and the movement of the pinch roller 16 is described below. The tape 6 drawn out by the tape guide 11 contacts with a guide 38 in the vicinity of the tape pulling reel 5. An end-tape (leader tape) detector 39 is arranged in a tape path near the guide 38. The slide bases 19 and 21 move along the guide grooves 24 and 25 to guide the tape 6 onto the magnetic head drum 2 and subsequently are fixed on the positioning members 26 and 27 so that the tape 6 is set on the magnetic head drum 2. Since the guide plate 23 curves vertically, the vertical position of the slide base 19 on the positioning member 26 is lower than that of the slide base 19 in the cassette 3 and the vertical position of the slide base 21 on the positioning member 27 is higher than that of the slide base 21 in the cassette 3. A fixed inclined guide 40, a fixed head 41 and a fixed guide 42 are arranged in a tape path between the tape guide 10 and the guide roller 12. The fixed inclined guide 40 guides the tape of tape supplying side between the tape guide 10 and the guide roller 12 which is inclined in comparison with the tape guide 10 and whose vertical position is different from that of the tape guide 10. The fixed guide 42 guides the tape 6 onto the fixed head 41. The fixed head 41 can erase record signals over the width of tape. The guide roller 12 changes the tape path direction and the inclined guide 14 guides the tape 6 smoothly onto the magnetic head drum 2. In the tape path between the guide roller 13 and the tape guide 11, an A/C head 43, a fixed guide 44, a fixed inclined guide 45, a guide 46 and a capstan 47 are arranged. The A/C head 43 can record and reproduce audio signals and control signals for controlling the tape-feed. The fixed guide 44 guides the tape 6 onto the A/C head 43. The fixed inclined guide 45 changes the tape attitude so that the tape 6 is guided from the magnetic head drum 2 to the tape pulling reel 5. The guide 46 guides the tape 6 onto the A/C head 43 and the capstan 47. The capstan 47 is driven by a motor arranged under the capstan 47. The tape 6 is nipped by the pinch roller 16 and the capstan 47 and fed in accordance with the rotation of the capstan 47. The inclined guide 15 changes the attitude of the tape 6 in the vicinity of the drum 2 so that the tape 6 is guided through the fixed inclined guide 45 to the cassette 3 whose vertical position is different from that of the cassette 3.

The tape attitude compensating guides 48 and 49 do not contact with the tape 6 when the tape 6 is not drawn out from the cassette 3 and after the tape 6 is loaded on the magnetic head drum 2. When the tape 6 is drawn out by the guide rollers 12, 13 and the inclined guides 14, 15 from the cassette 3 to be loaded on the magnetic head drum 2, the tape attitude compensating guides 48 and 49 contact with the tape 6 and stabilize the tape attitude which varies because of the variation of vertical position of the tape 6 guided onto the magnetic head drum 2. Therefore, the tape 6 is correctly guided onto the magnetic head drum 2.

When the tape 6 is drawn out from the cassette 3, the tape guides 10 and 11 for drawing out the tape 6 from the cassette 3 pass near the end-tape detectors 37 and 39, respectively, and the end-tape detector 37 can detect the end-tape drawn out from the tape supplying reel 4 and the end-tape detector 39 can detect the end-tape drawn out from the tape pulling reel 5. In the structure shown in FIG. 3, when the end-tape detector 37 and 39 can not detect the end-tape, the tape 6 does not contact with the magnetic head drum 2, the guide rollers 12, 13 and the inclined guides 14, 15.

Figure 4A:
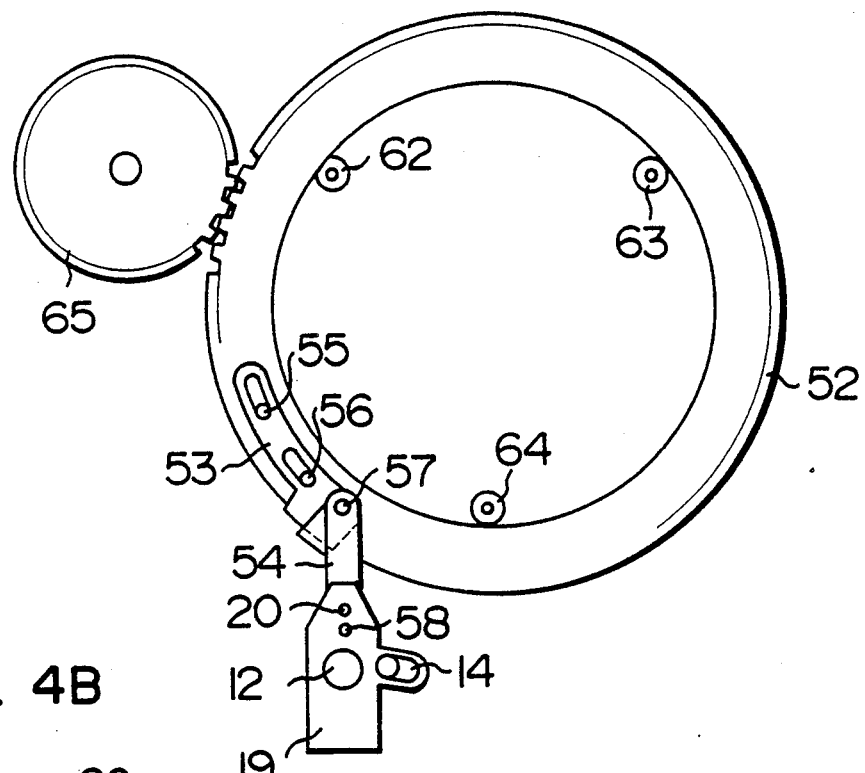
FIG. 4A is a plane view showing a slide base driving mechanism of tape supplying side.

In FIG. 4A showing a slide base driving mechanism of tape supplying side, an annular loading ring 52 is supported by rotatably rollers 62, 63 and 64 contacting with an inner periphery of the ring 52. The axis of the loading ring 52 is identical with that of the magnetic head drum 2. The loading ring 52 is driven through a rotational gear 65 by a driving source. A slider 53 is guided by shafts 55 and 56 on the loading ring 52. A shaft 57 is fixed on an upper portion of the slider 53 extending upwardly. An end of a rotatable arm 54 is supported by the shaft 57. Another end of the rotatable arm 54 has a shaft 58 through which the arm 54 is swingably connected to the slide base 19. The slider 53 is pulled by a spring (not shown) in the circumferential direction on the loading ring 52 so that the loading ring 52 pulls the slide base 19 through the spring when the slide base 19 is set in the positioning member 26.

Figure 4B:
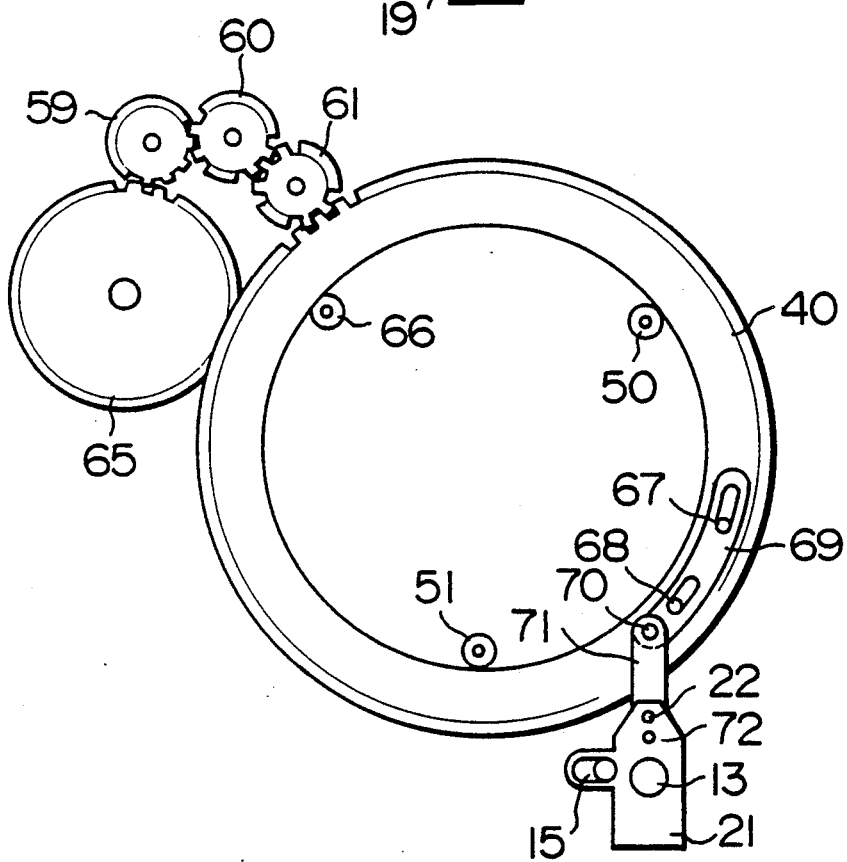
FIG. 4B is a plane view showing a slide base driving mechanism of tape pulling side.

In FIG. 4B showing a slide base driving mechanism of tape pulling side, an annular loading ring 40 is supported by rotatable rollers 50, 51 and 66 contacting with an inner periphery of the ring 40. The loading ring 40 is arranged above the loading ring 52 and the axis of the loading ring 40 is identical with that of the magnetic head drum 2. The loading ring 40 is driven by the gear 65 through a gear train composed of gears 59, 60 and 61. The rotational direction of the loading ring 40 is opposed to that of the loading ring 52. A slider 69 is guided by the shaft 67 and 68 on the loading ring 40. An arm 71 is swingably connected to the slider 69 through a shaft 70 fixed on an end of the slider 69 and also is swingable connected to the slide base 21 through a shaft 72. The slider 59 is pulled by a spring (not shown) in the circumferential direction on the loading ring 40 so that the loading ring 40 pulls the slide base 21 through the spring when the slide base 21 is set in the positioning member 27.

Figure 5:
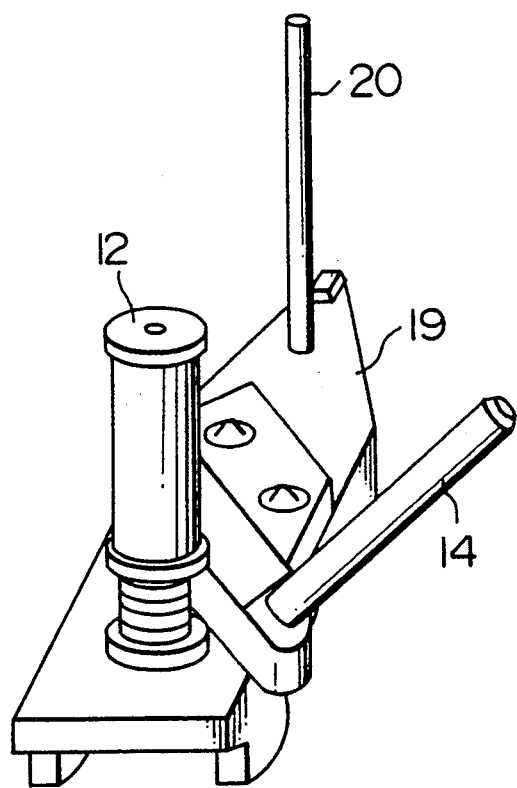
FIG. 5 is a perspective view showing a slide base.
Figure 6:
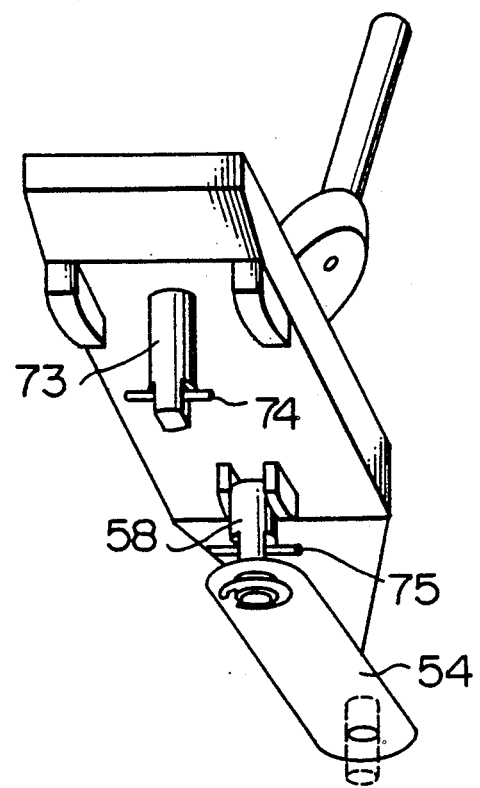
FIG. 6 is a perspective view showing a slide base.

In FIGS. 5 and 6 showing the slide base 19, the guide roller 12, the inclined guide 14 and a pin 20 are mounted on the slide base 19. The slide base 19 has projections which slide on the guide plate 23. The slide base 19 also has shafts 73 and 58. The shaft 73 has a pin 74 and the shaft 58 has a pin 75. The guide plate 23 is arranged between the projections and the pin 74 and between the projection 19 and the pin 75 so that the slide base 19 is prevented from being disengaged from the guide plate 23. The shaft 58 supports swingably the arm 54 through which the shaft 58 is connected to the shaft 57 fixed on the slider 53. The slide base 21 has also similar structure.

Figure 7:
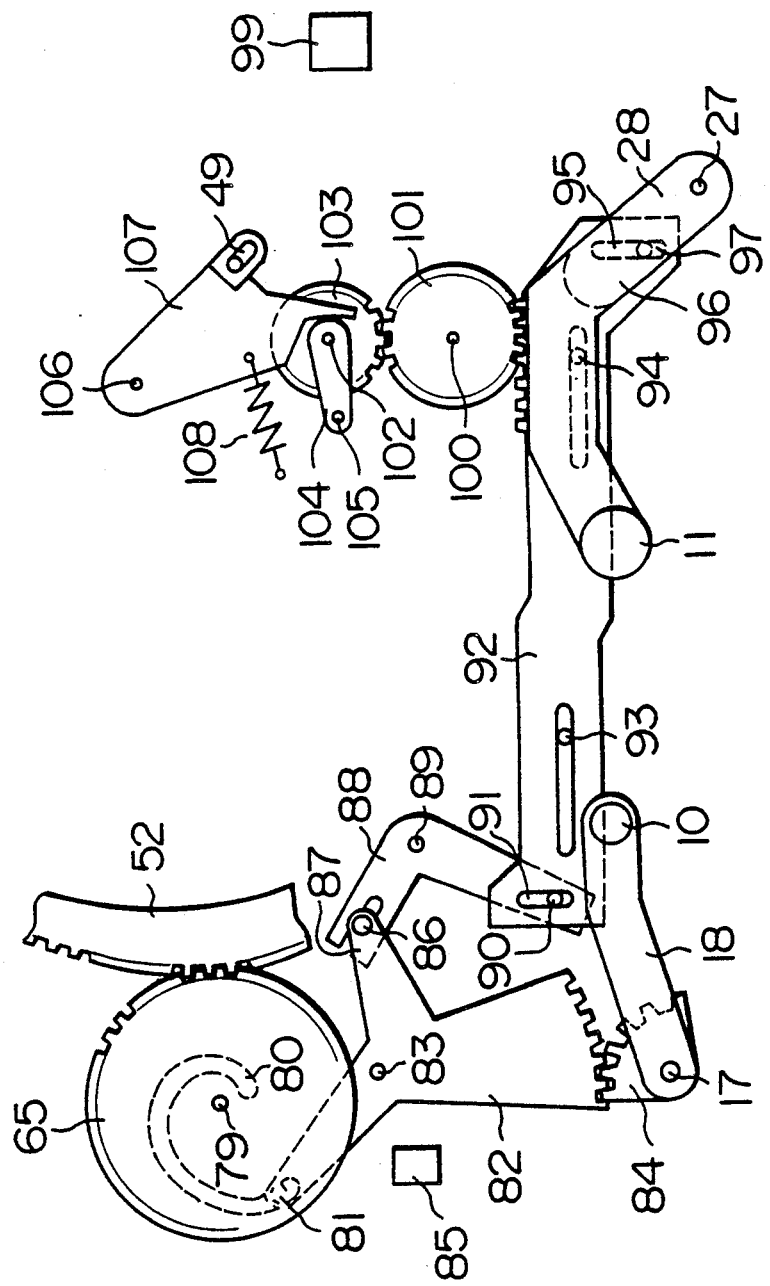
FIG. 7 is a plane view showing a mechanism for drawing out the tape from the cassette, in a condition before the start of tape setting operation.
Figure 8:
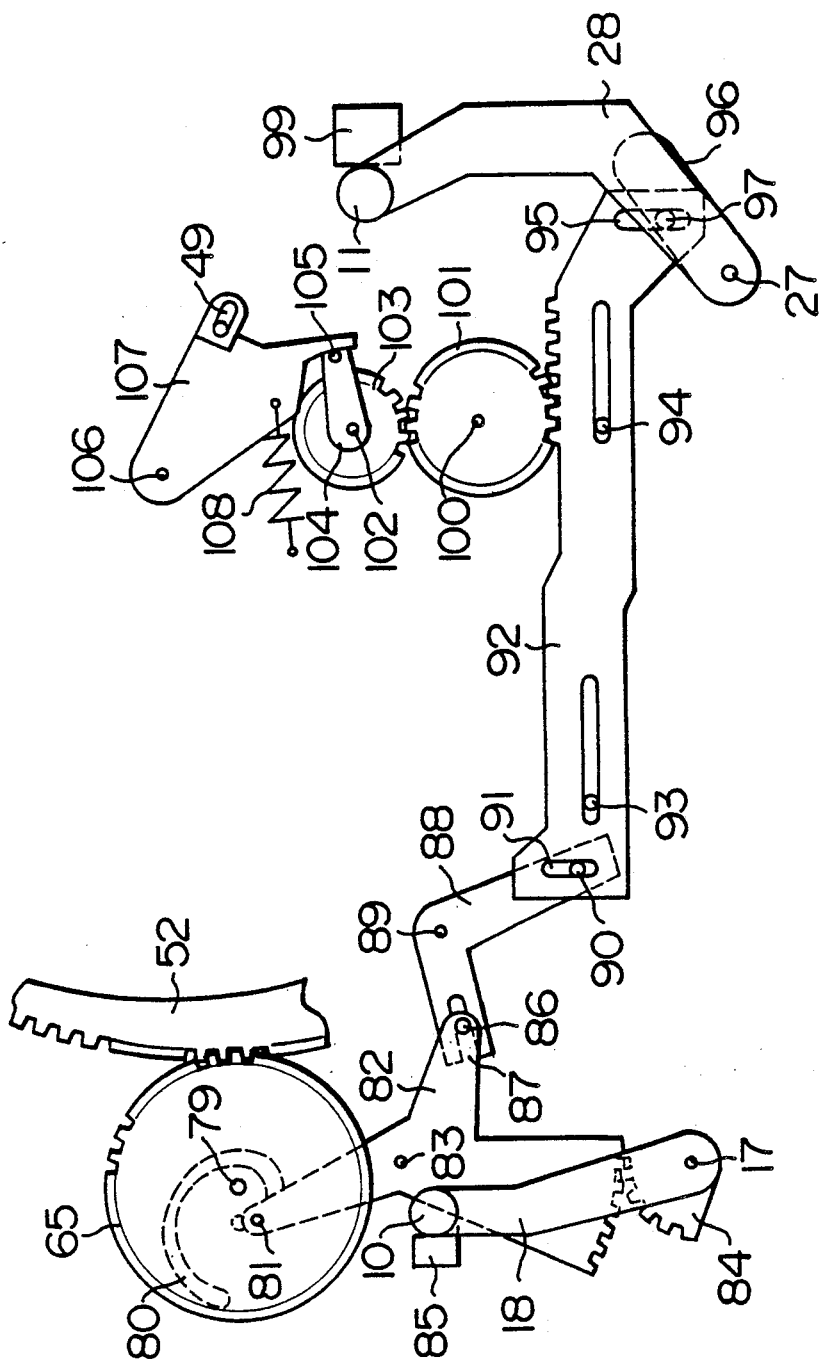
FIG. 8 is a plane view showing a mechanism for drawing out the tape from the cassette, in a condition after the completion of tape setting operation.

In FIGS. 7 and 8, a mechanism for driving the tape guides 10 and 11 is shown. The lower surface of the gear 65 for driving the loading ring 52 has a cam groove 80 as shown in FIGS. 7 and 8. The cam groove 80 engages with a pin 81 fixed on an end of an arm 82 which is rotatable on a shaft 83. When the gear 65 rotates on the shaft 79, the arm 82 swings on the shaft 83. Another end of the arm 82 has a gear portion which engages with a gear 84 supported swingably on the shaft 17. Through a spring (not shown) the gear 84 pulls the arm 18 which is supported swingably on the shaft 17 and whose movable range is limited by the limiting member 85. When the gear 84 is rotated from the position shown in FIG. 7 (start position of loading) to the position shown in FIG. 8 (completion position of loading) and the arm 18 contacts with the limiting member 85, the arm 18 is pulled through the spring by the gear 84. The other end of the arm 82 has a pin 86 which engages with a groove 87 arranged at an end of an arm 88. The arm 88 is swingably supported on a shaft 89. Another end of an arm 88 has a pin 90 which engages with a long groove 91 arranged at an end of a slider 92. The slider 92 is guided by shafts 93 and 94 so that the slider 92 can slide. Another end of the slider 92 has a long groove 95 which engages with a pin 97 fixed on an arm 96. The long grooves 91 and 95 extend in the direction perpendicular to the slide direction of the slider 92. The arm 96 is swingably supported on a shaft 27. An arm 28 is also swingably supported on a shaft 27 and is connected through a spring (not shown) to the arm 96 so that the arm 28 is pressed against a limiting member 99 through the spring when the gear 65 is rotated and the arm 96 is swung toward the limiting member 99.

The slider 92 has a gear portion engaging with a gear 101 which is rotatable on a shaft 100 and which engages with a gear 103. The gear 103 is rotatable on a shaft 102. An arm 104 is fixed on an upper surface of the gear 103. A pin 105 is fixed on an end of the arm 104. A compensating guide 49 of tape pulling side is fixed on an end of an arm 107 which is swingable on a shaft 106. Another end of the arm 107 has a cam portion which is pressed against the arm 104 by a spring 108 as shown in FIG. 7 so that the movement of the compensating guide 49 is controlled. When the slider 92 is moved to the position shown in FIG. 8, the gear 103 is rotated through the gear 101 and the pin 5 moves the arm 107 pulled by the spring 108. As shown in FIG. 7, the arm 107 contacts with a cylindrical cam surface of the arm 104 and the compensating guide 49 is not driven through the pin 105, until the predetermined amount of the tape 6 is drawn out from the cassette 3. When the tape 6 is set on the magnetic head drum 2 and the cam portion of the arm 107 contacts with the pin 105, the compensating guide 49 is arranged out of the tape path so that the guides 40 and 42 guide the tape instead of the compensating guide 49, as shown in FIG. 2.

Figure 9:
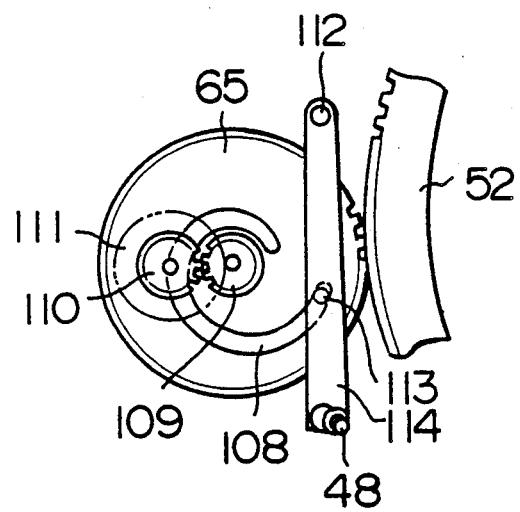
FIG. 9 is a plane view showing a compensating guide driving mechanism of tape supplying side, in a condition before the start of tape setting operation.
Figure 10:
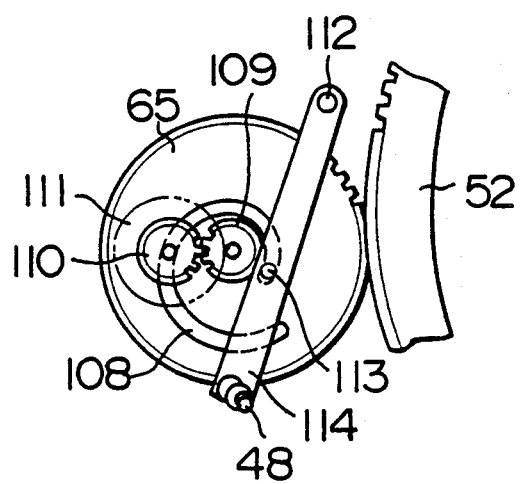
FIG. 10 is a plane view showing a compensating guide driving mechanism of tape supplying side, in a condition after the completion of tape setting operation.

In FIGS. 9 and 10, a mechanism for driving the compensating guide 48 of tape supplying side is shown. The compensating guide 48 is arranged between the tape guide 10 and the slide base 19. An upper surface of the gear 65 has a groove 108 which engages with a pin 113 fixed on an arm 114. The arm 114 is swingably supported on a shaft 112. The compensating guide 48 mounted on an end of the arm 114 is driven in accordance with the space of the groove 108. Until the predetermined amount of the tape 6 is drawn out from the cassette 3, the pin 113 is guided in the outer circumferential part of the groove 108. The outer circumferential part of the groove 108 has a constant distance between the axis of the shaft 112 and the outer circumferential part, so that the compensating guide 48 is not moved by the rotation of the gear 65. When the tape 6 is set on the magnetic head drum 2 and the pin 113 is guided in the inner circumferential part of the groove 108, the compensating guide 48 is arranged out of the tape path so that the guides 44, 45 and 46 guide the tape instead of the compensating guide 48, as shown in FIG. 2.

As shown in FIGS. 9 and 10, a gear 109 fixed coaxially on the gear 65 drives a gear 110 connected to a positional sensor 111 for measuring the rotational degree of the gear 65, that is, the positions of the sliders 19 and 21.

Figure 11:
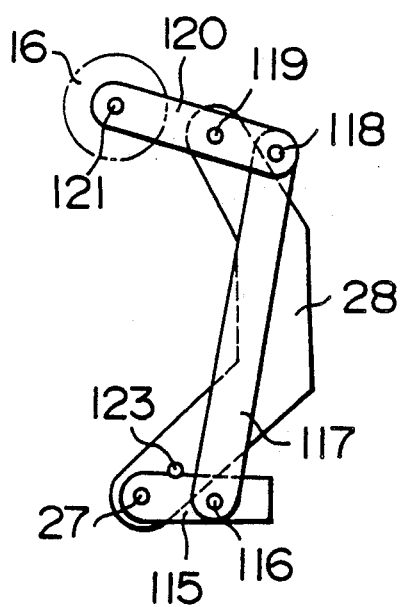
FIG. 11 is a plane view showing a driving mechanism for a pinch roller which presses the tape against a capstan roller, in a condition after the completion of tape setting operation.
Figure 12:
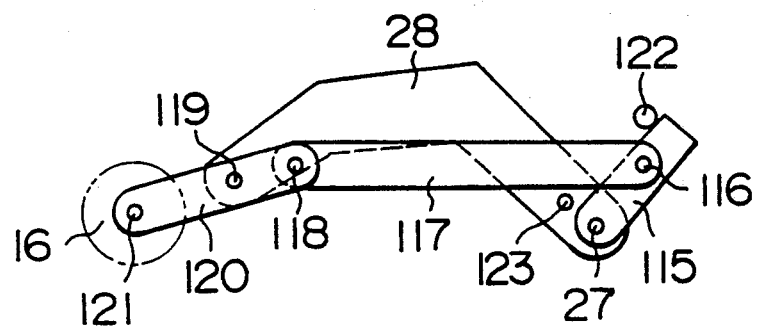
FIG. 12 is a plane view showing a driving mechanism for a pinch roller which presses the tape against a capstan roller, in a condition before the start of tape setting operation.

As shown in FIGS. 11 and 12, a shaft 119 is fixed on an end of the arm 28. An arm 120 is swingably supported on the shaft 119 and is pulled by a spring (not shown) in the anticlockwise direction. The pinch roller 16 is supported through a shaft 121 on an end of the arm 120 and rotatable on the shaft 121. A shaft 118 is fixed on another end of the arm 120. An end of an arm 117 is swingably supported through the shaft 118 on the arm 120. Another end of the arm 117 is swingably supported through a shaft 116 on the arm 115. When the tape 6 is set completely on the magnetic head drum 2, as shown in FIG. 11, the arm 117 is pulled upwardly by the spring, so that the arm 115 is rotated in the anticlockwise direction. Since the rotation of the arm 115 is limited by a pin 123 fixed on the arm 28, the positional relation between the pinch roller 16 and the arm 28 is maintained at the predetermined condition. When the arm 28 is moved from the position shown in FIG. 11 to the position at which all the tape 6 is received in the cassette 3, as shown in FIG. 12, the arm 115 engages with a stopper 122 at the predetermined position. After the engagement of the arm 115 and the stopper 122, the engagement of the arm 115 and the pin 123 is released and the arm 117 is pulled by the shaft 116 fixed on the arm 115. The arm 120 is rotated by the arm 117 so that the pinch roller 16 and the tape guide 11 mounted on the shaft 119 are moved to the predetermined position in the opening 7 of the cassette 3.

Figure 13:
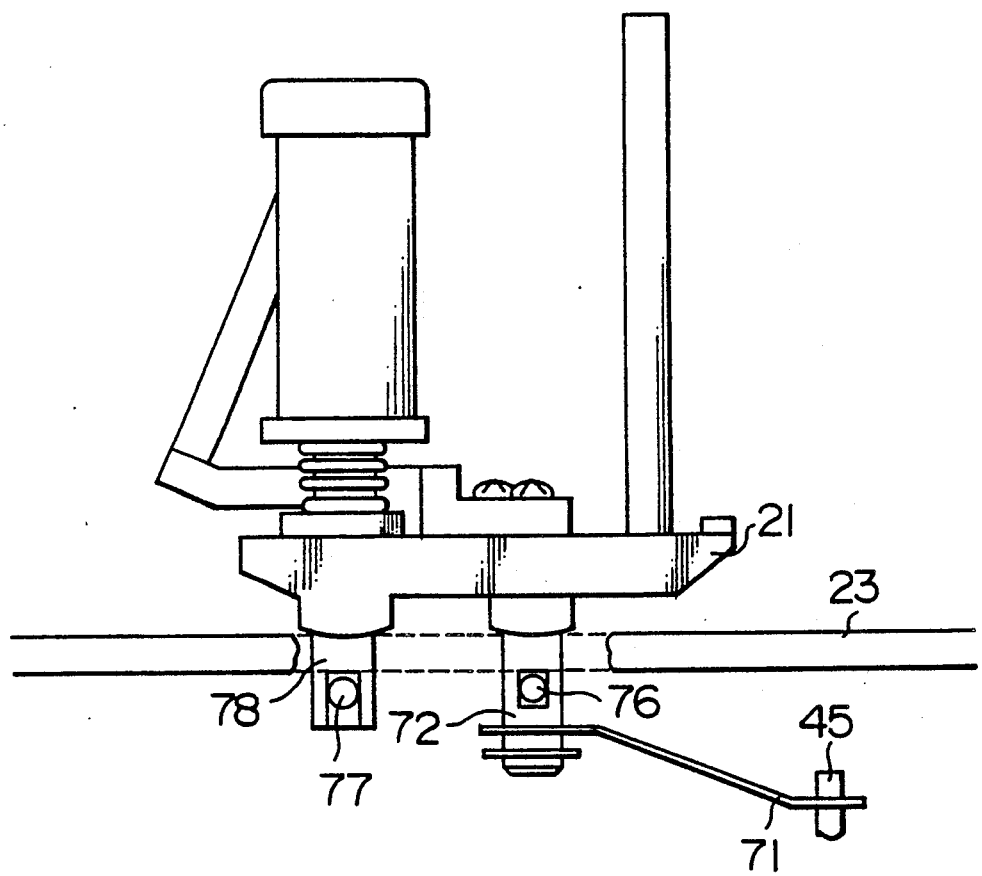
FIG. 13 is a side view showing a mechanism for guiding and driving the slide base.
Figure 14:
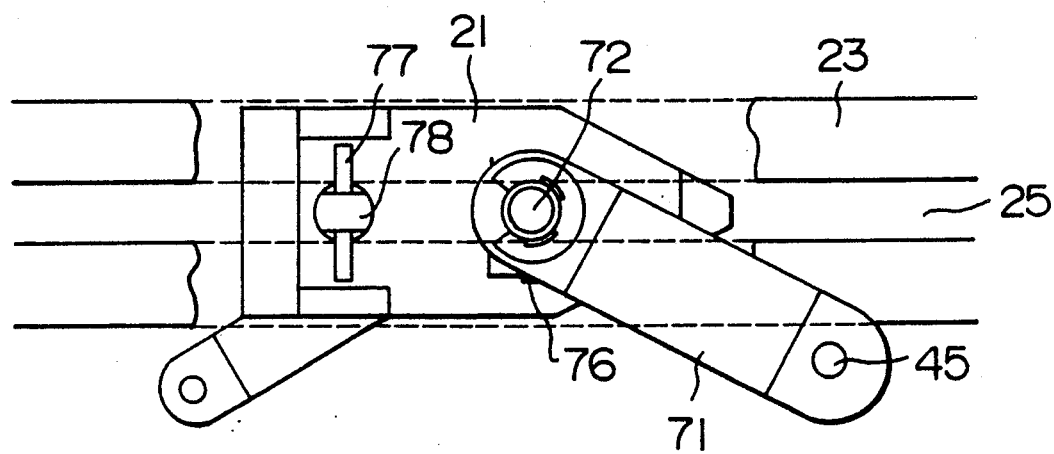
FIG. 14 is a plane view showing a mechanism for guiding and driving the slide base.

In FIG. 13 and FIG. 14, a mechanism for guiding the slide base 21 on the guide plate 23 is shown. The guide plate 23 is arranged between the projections and the pin 77 and between the projection and the pin 76 so that the slide base 21 is guided on the guide plate 23. The slide base 21 is driven by the arm 71 for the tape loading operation. The shafts 72 and 78 are fitted in the guide groove 25 so that the moving path of the slide base 21 is limited.

Figure 15:
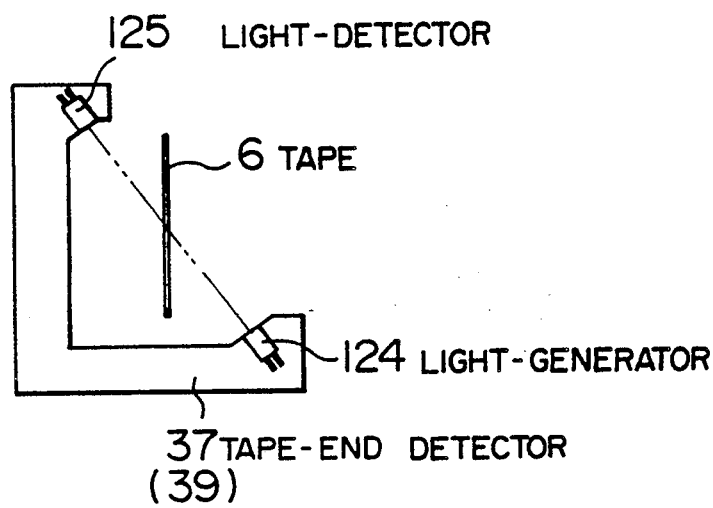
FIG. 15 is a side plane view showing a tape-end detector.

Each of tape-end detectors 37 and 39 shown in FIG. 15 has a light generator 124 and a light detector 125. The tape 6 extends obliquely through a light axis between the light generator 124 and the light detector 125. When the light generated by the light generator 124 can not pass through the tape 6, for example, the magnetic tape, the light detector 125 does not generate a signal. When the light generated by the light generator 124 can pass through the tape, for example, the leader tape, the light detector 125 generates a signal so that the leader tape or tape-end is detected.

Figure 16:
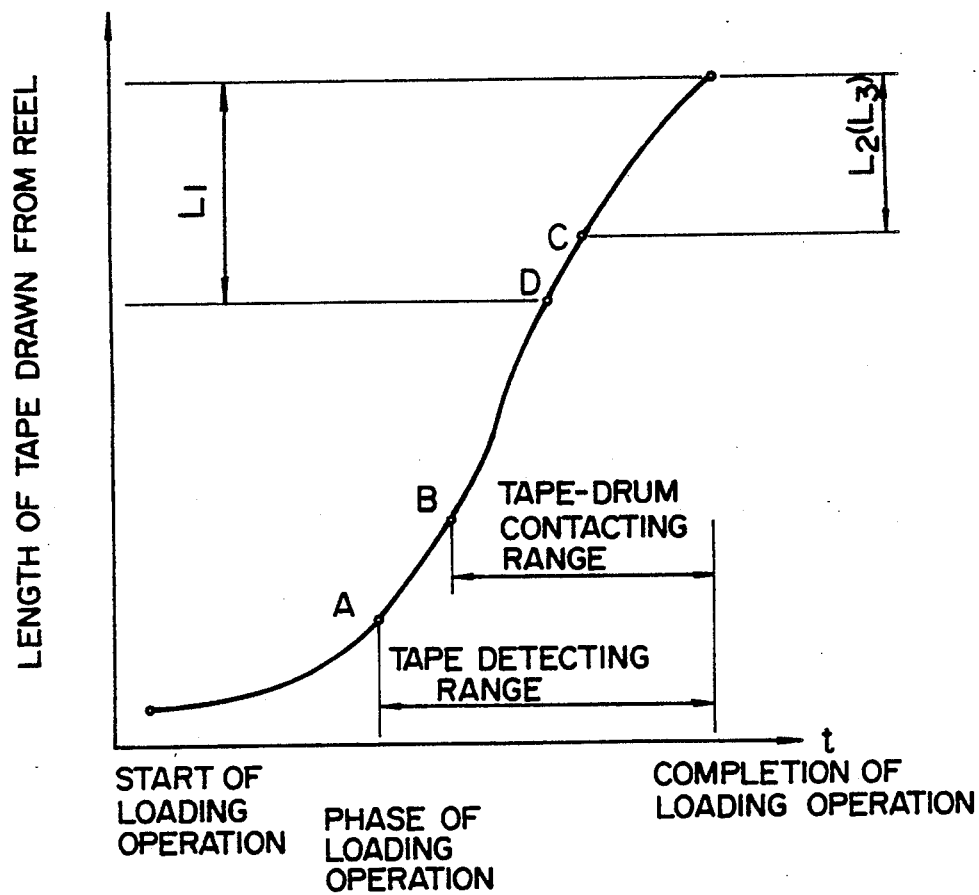
FIG. 16 is a diagram showing a relation between condition of tape loading and length of tape drawn out from tape cassette.

In FIG. 16, a relation between the length of tape drawn out from the cassette and the condition of loading operation is shown by a characteristic curve composed of a plurality of curves whose curvature are generally different from each other. The characteristic curve can be measured in an actual apparatus or can be calculated from the actual structure of apparatus. Since the tape is not returned into the cassette during the loading operation, the length of tape drawn out from the cassette is not decreased during the loading operation. A-point in FIG. 16 indicates substantially a half-loading position of loading mechanism as shown in FIG. 2. After the loading mechanism passes the A-point, the tape-end detectors can detect the tape-end. After the loading-mechanism passes B-point in FIG. 16, the tape contacts with the magnetic head drum and it is important to detect the tape-end. In this embodiment, the A-point is close to the B-point. Since the tape-end can not be detected before the loading mechanism passes the A-point, the loading mechanism should pass the B-point after the A-point.

In a condition of tape loading operation as shown in FIG. 2, the tape loading operation is completed so that the tape path is completely formed. A length of tape path between the tape-end detector 37 and a tape supplying side end of a drum-tape contacting portion at which the magnetic head drum 2 contacts with the tape 6 is indicated by L1 in FIG. 16. A length of tape path between the tape-end detector 39 and a tape pulling side end of the drum-tape contacting portion is indicated by L2 in FIG. 16. L3 indicates smaller one of L1 and L2. In this embodiment, L1 is larger than L2. L4 indicates a length of tape drawn out after one of the tape-end detectors detects the tape-end and until the tape loading operation is completed. When L4 is smaller than L3, even if the tape is drawn out from only one of the reels after one of the tape-end detectors 37 and 39 detects the tape-end, the tape-end or leader tape does not contact with the magnetic head drum. A length of tape drawn out after the loading mechanism passes C-point shown in FIG. 16 and until the tape loading operation is completed is equal to L3, that is, to L2 in this embodiment. A length of tape drawn out after the loading mechanism passes D-point shown in FIG. 16 and until the tape loading operation is completed is equal to L1. Since the tape-end or leader tape does not contact with the magnetic head drum if one of the tape-end detectors detects the tape-end after the loading mechanism passes C-point, the loading operation can be continued. If the loading operation is stopped when one of the tape-end detectors detects the tape-end before the loading mechanism passes C-point, the tape-end or leader tape does not contact with the magnetic head drum, so that the tape damage is presented. Therefore, when the tape-end is detected between the A-point and C-point, the tape loading operation should be appropriately controlled.

The condition of tape loading operation is determined by the position of loading mechanism moving from a loading operation start position to a loading operation completion position. The position of loading mechanism is measured by a potentiometer 111 connected to the loading ring. L4 is determined by the condition of tape loading operation, that is, by the position of loading mechanism measured by a potentiometer 111 on the basis of the characteristic curve as shown in FIG. 16. In order that the tape loading operation is appropriately controlled between the A-point and C-point, L4 is compared with L1 or L2 when the tape-end detector 37 or 39 detects the tape-end that is, the output of potentiometer generated at the time of that the tape-end detector 37 or 39 detects the tape-end is compared with the outputs of potentiometer corresponding to the C-point and D-point.

FIG. 17A shows the basic loading operation for case of that the tape-end is not detected during the loading operation. At start of loading operation, suitable voltage is applied to a loading motor so that the loading mechanism is driven by the loading motor. The tape-end detector can detect the tape-end after the loading mechanism passes the A-point. When the tape-end detector does not detect the tape-end, that is, when the magnetic tape passes on the tape-end detector, the light axis of the tape-end detector is intercepted by the magnetic tape and the output of tape-end detector is high, FIG. 17B shows the loading operation for case of that the tape-end is detected after the loading mechanism passes the A-point and before the loading mechanism passes the B-point. The output of tape-end detector changes from low level to high level when the tape-end is detected, and changes soon from high level to low level. If the leader tape, that is, tape-end passes on the tape-end detector when the loading mechanism passes the A-point, the output of low level is continued. In this case, when the output of tape-end detector changes from high level to low level, inverse voltage which is inverse to the voltage of the normal loading operation is applied to the loading motor so that the loading operation is stopped and the loading motor rotates in the reverse direction for unloading operation and the predetermined amount of the tape including the detected tape-end is wound on the reel. After the predetermined amount of tape is wound on the reel, the loading operation is resumed. For example, if the above mentioned predetermined amount of tape is more than the amount of tape drawn out from both of the reels between the start of loading operation and completion of loading operation, there is no possibility of that the tape-end, that is, the leader tape contacts with the magnetic head drum after the loading operation is resumed. Though this method needs a long time until the loading operation is completed, the damage of magnetic head drum is perfectly prevented.

FIG. 17C shows the loading operation for case of that the tape-end is detected by the tape-end detector 37 after the loading mechanism passes the D-point or for case of that the tape-end is detected by the tape-end detector 39 after the loading mechanism passes the C-point. In this case, since L4 is smaller than L1, the tape-end does not contact with the magnetic head drum even if the tape is drawn not through the tape-end detector 39 but only through the tape-end detector 37 after the tape-end is detected by the tape-end detector 37 until the loading operation is completed. And since L4 is smaller than L2, the tape-end does not contact with the magnetic head drum even if the tape is drawn not through the tape-end detector 37 but only through the tape-end detector 39 after the tape-end is detected by the tape-end detector 39 until the loading operation is completed. The loading operation can be continued in these cases. Therefore, the time required for the tape loading head drum is prevented.

FIG. 17D shows another kind of loading operation in which the reels can be braked. In this case, when the tape-end is detected by the tape-end detector 37 before the loading mechanism passes the D-point or the tape-end is detected by the tape-end detector 39 before the loading mechanism passes the C-point, the reel from which the tape-end is drawn out is braked. Since the loading operation is continued, the time required for the tape loading operation is shortened in comparison with the above mentioned case of FIG. 17B and with the below mentioned case of FIG. 17E.

FIG. 17E shows the loading operation for case of that the tape-end is detected by the tape-end detector 37 after the loading mechanism passes the B-point and before the loading mechanism passes the D-point or for case of that the tape-end is detected by the tape-end detector 39 after the loading mechanism passes the B-point and before the loading mechanism passes the C-point. When the tape-end is detected, the tape loading operation is stopped and the loading motor is rotated in the reverse direction for unloading until the loading mechanism reaches the half loading position as shown in FIG. 3 so that the tape is arranged away from the magnetic head drum. Subsequently, the predetermined amount of tape, for example, the length of tape which will be drawn out after the half loading position until the loading operation is completed is wound on the reel from which the tape-end was drawn out. And the loading operation is resumed. In this case, since the tape path is formed in the half loading condition by guides all of which stand vertically, the tape can be wound on the reel. Therefore, the time for loading operation is shortened in comparison with the above mentioned case of FIG. 17B in which the tape loading mechanism is returned into the cassette and subsequently the tape is wound on the reel.

Since the tape can be drawn out from both of the reels in the cases of FIG. 17B, FIG. 17C and FIG. 17E after the tape-end is detected during the loading operation, the tension of tape is not increased in comparison with the case of FIG. 17D in which one of the reels is fixed and the tape is drawn out from only another reel. Therefore, the damage of tape is prevented.

Figure 18:
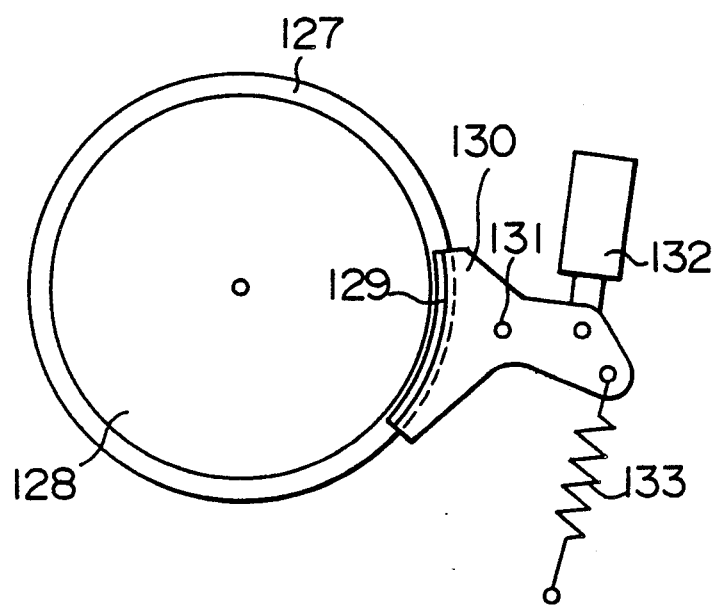
FIG. 18 is a plane view showing a mechanism for braking a reel.

In FIG. 18, the reel driving device of tape pulling side is shown. The reel driving device of tape supplying side has a similar structure. A reel motor 127 is attached to a reel mount 128 engaging with the reel of tape pulling side 5. The reel motor 127 is coaxialy connected to the reel 5 to drive the reel under the reel mount 128. An arm 130 swingable on a shaft 131 is arranged in the vicinity of the outer periphery of the reel mount 128. A brake member 129 is fixed to an end of the arm 130 is connected to a solenoid 132 and is pulled in clockwise direction by a spring 133. When the solenoid 132 is energized in the normal condition, the arm is rotated in unticlockwise direction by the force of the solenoid 132 against the force of the spring 133 so that the brake force is not applied to the reel mount 128. When the solenoid 132 is not energized, the arm is rotated in the clockwise direction by the force of the spring 133 so that the brake force is applied to the reel mount 128.

What is claimed is:
1. An apparatus for detecting a tape-end, comprising,
   a tape cassette including a magnetic tape wound on reels received in the tape cassette, and tape-ends arranged between the reels and magnetic tape respectively so that the magnetic tape is connected to the reels through the tape-ends,
   a magnetic head drum on which the magnetic tape is loaded,
   a tape loading device which draws out the tape from the tape cassette and which loads the magnetic tape onto a head surface of the magnetic head drum, tape-end detectors for detecting the tape ends on tape paths between the magnetic head drum and the reels, and loading controlling means including a loading phase measuring instrument which measures a phase of the tape loading device during loading operation when at least one of the tape-end detectors detects the tape end, the loading controlling means generating control signals for controlling the loading operation of the tape loading device in accordance with the measured phase.

2. An apparatus for detecting a tape-end, according to claim 1, the loading controlling means generating the control signals by which, when the loading operation is stopped, a predetermined amount of tape is wound onto the reel from which the tape-end was drawn out, and subsequently the loading operation is resumed.

3. An apparatus for detecting a tape-end, according to claim 1, the loading controlling means generating the control signals by which, when the tape-end detector detects the tape end and a length of tape path formed between the tape-end detector which detects the tape-end and an end of a drum-tape contacting portion at which the tape contacts with the magnetic head drum when the loading operation is completed is smaller than a length of tape drawn out by the tape loading device after the tape-end detector detects the tape-end and until the loading operation is completed, the reel from which the tape-end was drawn out is braked.

4. An apparatus for detecting a tape-end, according to claim 1, the loading controlling means generating the control signals by which, the tape loading operation is continued when the tape-end detector does not detect the tape-end, when the tape-end detector detects the tape end and a length of each of tape paths formed between the tape-end detectors and an end of a drum-tape contacting portion at which the tape contacts with the magnetic head drum when the loading operation is completed is smaller than a length of tape drawn out by the tape loading device after the tape-end detector detects the tape-end and until the loading operation is completed, the loading operation is stopped, and when the tape-end detector detects the tape end and the length of tape path formed between the tape-end detector which detects the tape-end and the end of a drum-tape contacting portion at which the tape contacts with the magnetic head drum when the loading operation is completed is larger than the length of tape drawn out by the tape loading device after the tape-end detector detects the tape-end and until the loading operation is completed, the loading operation is continued.

5. An apparatus for detecting a tape-end, according to claim 1, the loading controlling means generating the control signals by which, the tape loading operation is continued when the tape-end detector does not detect the tape-end, when the tape-end detector detects the tape end and a length of tape path formed between the tape-end detector which detects the tape-end and an end of a drum-tape contacting portion at which the tape contacts with the magnetic head drum when the loading operation is completed is smaller than a length of tape drawn out by the tape loading device after the tape-end detector detects the tape-end and until the loading operation is completed, the loading operation is stopped, and when the tape-end detector detects the tape end and the length of tape path formed between the tape-end detector which detects the tape-end and the end of a drum-tape contacting portion at which the tape contacts with the magnetic head drum when the loading operation is completed is larger than the length of tape drawn out by the tape loading device after the tape-end detector detects the tape-end and until the loading operation is completed, the loading operation is continued.

6. An apparatus for detecting a tape-end, according to claim 5, the loading controlling means generating the control signals by which, when the loading operation is stopped, a predetermined amount of tape is wound onto the reel from which the tape-end was drawn out, and subsequently the loading operation is resumed.

7. An apparatus for detecting a tape-end, according to claim 1, wherein, a length of tape path formed between the tape-end detector which detects the tape-end and an end of a drum-tape contacting portion at which the tape contacts with them magnetic head drum when the loading operation is completed is a border length, a position of the tape loading device from which the tape loading device draws out the tape by the border length until the loading operation is completed is a border position, the loading controlling means generating the control signals by which, the tape loading operation is continued when the tape-end detector does not detect the tape-end, when the tape-end detector detects the tape end and the tape loading device does not reach the border position, the loading operation is stopped, and when the tape-end detector detects the tape end and the tape loading device passes the border position, the loading operation is continued.

8. An apparatus for detecting a tape-end, according to claim 7, the loading controlling means generating the control signals by which, when the loading operation is stopped, a predetermined amount of tape is wound onto the reel from which the tape-end was drawn out, and subsequently the loading operation is resumed.

* * * * *